United States Patent [19]

Nomura et al.

[11] 4,128,683

[45] Dec. 5, 1978

[54] AUTO CEILING PANEL AND ITS MANUFACTURING PROCESS

[75] Inventors: Takao Nomura; Yoshiro Umemoto, both of Nagoya; Tatsuo Sakamoto, Okazaki, all of Japan

[73] Assignee: Toyota Jidosha Kogyo Kabushiki Kaisha, Aichi, Japan

[21] Appl. No.: 895,387

[22] Filed: Apr. 11, 1978

[51] Int. Cl.² ............... B62D 25/06; B32B 3/10; B32B 3/26
[52] U.S. Cl. ............... 428/138; 156/219; 156/245; 156/253; 156/306; 181/290; 264/321; 296/137 A; 428/158; 428/213; 428/313; 428/315
[58] Field of Search ........... 296/137 A, 137 R; 181/288, 290–294; 156/219, 252, 253, 245, 306; 264/321; 428/137, 138, 158, 159, 213–215, 310, 313, 315

[56] References Cited

U.S. PATENT DOCUMENTS

| | | | |
|---|---|---|---|
| 3,647,588 | 3/1972 | Greig | 428/313 |
| 3,697,126 | 10/1972 | Tiffin et al. | 428/315 |
| 3,954,537 | 5/1976 | Alfter et al. | 428/315 |
| 3,966,526 | 6/1976 | Doerfling | 156/252 |
| 4,073,991 | 2/1978 | Focht | 428/315 |

*Primary Examiner*—William J. Van Balen
*Attorney, Agent, or Firm*—Oblon, Fisher, Spivak, McClelland & Maier

[57] ABSTRACT

Highly acoustical auto ceiling panel characterized in that polyethylene foams are laminated with a metal lath sandwiched between them; the surface of the interior side polyethylene foam is coated with a vinyl chloride sheet and this foam with said sheet is provided with numerous small holes through two layer, while the other polyethylene foam across said metal lath is provided with numerous through holes of a diameter larger than that of the hole in the former foam; and the manufacturing process of this auto ceiling panel.

20 Claims, 5 Drawing Figures

AUTO CEILING PANEL AND ITS MANUFACTURING PROCESS

BACKGROUND OF THE INVENTION

1. Field of the Invention:

The present invention relates to a highly acoustical auto ceiling panel and its manufacturing process.

2. Description of the Prior Art:

The conventional auto ceiling panel is a three-layer structure in which a metal lath is sandwiched between polyethylene foams with isolated air bubbles, said metal lath being thermally fused to these foams or it is a four-layer structure in which a metal lath is sandwiched between a polyethylene foam with a vinyl chloride sheet and another polyethylene foam. In such laminated (three-layer or four-layer) structures the heat insulation and safety to the human body are fully assured, but on account of the polyethylene foam having isolated air bubbles, the soundproofing of the interior noise is not well assured.

It has been known that provision of holes through auto ceiling panel would improve the acoustical characteristic thereof. In such three-layer or four-layer structure the presence of said metal lath sandwiched between polyethylene foams hinders the boring of such through holes with an acoustical effect and it is impossible to bore such through holes after lamination is done.

For these reasons, the conventional practice is to bore through holes separately on each polyethylene foam to be pasted together and thereafter laminate the foams on both sides of the metal lath. Even in this practice it is difficult to laminate the upper and lower foams with identical pattern with the result that a very few through holes running in both foams are obtained and a prominent effect of absorbing the sound is not secured for all the trouble of working.

SUMMARY OF THE INVENTION

The primary object of the present invention is to provide a highly acoustical auto ceiling panel which is free from the defects of the conventional auto ceiling panel and can well absorb the noise in the vehicle.

Another object of the present invention is to provide an auto ceiling panel manufacturing process which can easily provide numerous through holes with an acoustical effect.

DESCRIPTION OF THE PREFERRED EMBODIMENT

The auto ceiling panel according to the present invention is substantially such a structure that polyethylene foams are laminated on both sides of a metal lath; the surface of the interior side polyethylene foam is coated with a vinyl chloride sheet; many fine holes are provided through this polyethylene foam and the vinyl chloride; and the opposite polyethylene foam is bored with many through holes with a diameter larger than that of the hole in the former foam.

Such an auto ceiling panel is manufactured substantially by such a process that the interior side polyethylene foam is coated with a vinyl chloride sheet; through two layers of this foam a large number of small holes are bored by a punching machine, while the other polyethylene foam is bored with a large number of large holes; a metal lath is sandwiched between the two polyethylene foams; these two foams are thermally fused to said metal lath; and then the sandwiched lamination is cold-worked to a specified profile.

Figure 1:
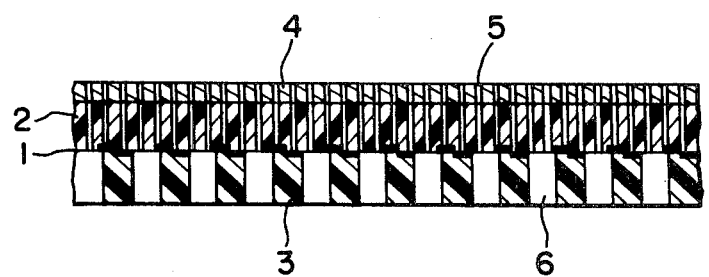
FIG. 1 is a section view of an auto ceiling panel according to the present invention.
Figure 2:
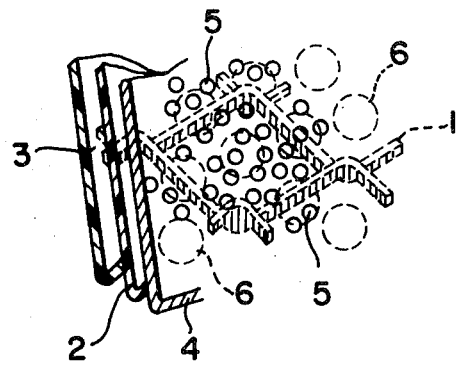
FIG. 2 is an oblique view of the ceiling panel in FIG. 1.

Here is to be described an example of an auto ceiling panel according to the present invention. In FIGS. 1 and 2, 1 is a metal lath 0.5 - 1.5mm thick and it is sandwiched between polyethylene foams 2, 3 1.0 - 8.0mm thick with a specific gravity 0.02 - 0.1. The interior side surface of 2 is coated with a vinyl chloride sheet 4 0.01 - 0.5mm thick with an embossed pattern. This vinyl chloride sheet-coated polyethylene foam 2 is bored with numerous through holes 5 or 0.1 - 3.0mm diameter at an open rate of 1 - 20%. Meanwhile the other polyethylene foam (constituting the lining on the side of the ceiling) 3 opposite to 2 is bored with numerous larger holes 6 of 1.0 - 8.0mm diameter which is larger than that of the hole 5 at an open rate of 1.0 - 50%. Thus the panel is a pasted combination of the ceiling side polyethylene foam 3 with large holes 6 and the interior side polyethylene foam 2 with small holes 5 and in such a panel the probability of through holes being produced is higher than in a combination of polyethylene foams with identical small holes; at least the small holes 5 which overlap the large holes 6 become through ones.

The embossed pattern to be provided on the vinyl chloride sheet bonded to the interior side surface of polyethylene foam 2 can be optionally selected according to necessity.

Figure 3:
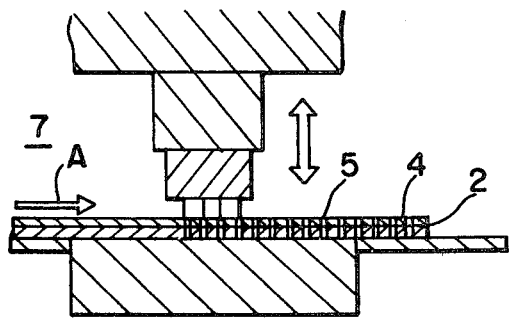
FIG. 3 is a front sectional view of a punching machine to be used in the manufacture of the ceiling panel in FIG. 1.
Figure 4:
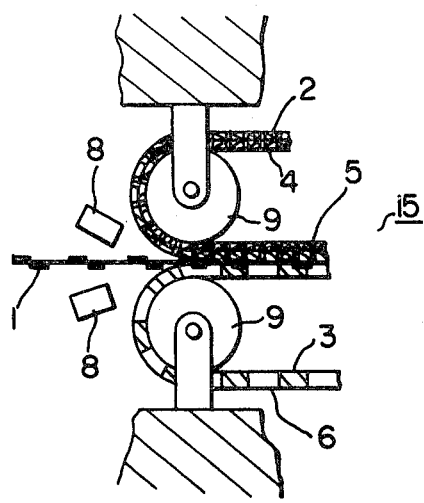
FIG. 4 is a front section view of a laminating machine to be used in the manufacture of the ceiling panel in FIG. 1.
Figure 5:
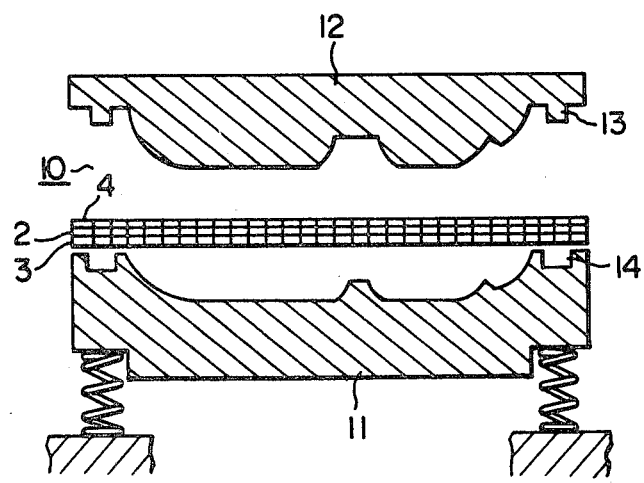
FIG. 5 is a front section view of a molding machine to be used for the manufacture of the auto ceiling panel.

Next the process of manufacturing the auto ceiling panel according to the present invention is to be described in detail referring to FIGS. 3 to 5.

At first a vinyl chloride sheet 4 of 0.01 - 0.5mm thickness with an embossed pattern thereon is applied to the surface of a polyethylene foam 2 of 1.0 - 8.0mm thickness (specific gravity 0.02 - 0.1) with a bonding agent etc.; then as indicated in FIG. 3, numerous small holes 5 of 0.1 - 3.0mm diameter are bored through two layers of this polyethylene foam and said vinyl chloride sheet at an open rate of 1 - 20% by passing the polyethylene foam 2 through a punching machine 7 in the arrow A direction with the side of said vinyl chloride sheet 4 on top. Meanwhile numerous large holes 6 of 1.0 - 8.0mm diameter are bored by the punching machine 7 at an open rate of 1 - 50% on another polyethylene foam 3 (of the same thickness and specific gravity as 2). Boring of holes may be done with the 4 side down.

The polyethylene foams 2, 3 thus separately bored by the punching machine 7 are, as indicated in FIG. 4, heated by the heater 8; a metal lath 1 is sandwiched between these two foams 2, 3 and the whole thing is laminated through thermal fusion in the roll 9 of the laminating machine 15. Through this lamination a ceiling panel with through holes as illustrated in FIG. 1 can be obtained. The ceiling panel with such a structure is so rigid and sound-isolating as to make an auto ceiling with an excellent effect of absorbing the noise.

Next the ceiling panel thus laminated is cut to a required size and press-molded to a desired profile by a cold press-molding machine 10 as shown in FIG. 5. The press-molding machine 10 consists of a stationary bottom mold 11, a top mold 12 which is vertically movable in relation to said bottom mold 11, an anti-wrinkle male member 13 and a female member 14. When the ceiling panel thus obtained is placed with the vinyl chloride sheet side on top in the machine, the top mold 12 together with the anti-wrinkle male member 13 is lowered to squeeze the fringe of the ceiling panel between said male and female members 13, 14; and thereby the panel is molded to a desired profile by the top 12 and the bottom 11 mold without wrinkling.

Next, the reasons for the dimensional limitations in the present invention are to be explained.

As for the thickness limitation of polyethylene foams, at a thickness of less than 1.0mm the metal lath will become so prominent as to spoil the appearance and at a thickness of more than 8.0mm the panel will become heavy, resulting in a cost-up.

As for the diameter limitation of small holes to be bored in polyethylene foam, when the diameter of the hole to be bored in the polyethylene foam 2 is less than 0.1mm, the sound-absorbing effect will be poor; and when it is more than 3.0mm, the appearance will be spoiled.

As for the diameter limitation of large holes to be bored in polyethylene foam 3, at a diameter of less than 1.0mm a sufficient number of through holes will not be secured, resulting in a poor effect of sound absorption, while at a diameter of more than 8.0mm, a failure of press-molding will be liable to occur. As for the open rate in the polyethylene foam 2, the sound-absorbing effect will not be high enough at less than 1%, but at more than 20% the appearance will be spoiled.

As for the open rate in the polyethylene foam 3, there will be no sound-absorbing effect at less than 1%, but at more than 50%, the liability of poor molding will increase.

Thus in the ceiling panel according to the present invention in which a vinyl chloride sheet-coated polyethylene foam is bored with fine holes, while another polyethylene foam is bored with less fine holes; and a metal lath is sandwiched between these two foams by thermal fusion, through holes are perfect at least where the fine holes and the less fine holes overlap each other, yielding a highly permeable ceiling panel with an excellent effect of insulating and absorbing the sound.

The following benefits accrue from the auto ceiling panel and its manufacturing process according to the present invention:

1. The laminated structure of the panel being such that small holes are bored on the interior side polyethylene foam, while large holes are bored on the lining of the ceiling, the sound-absorbing effect is far superior to that in the conventional one.
2. The holes bored are not so large as to spoil the appearance but numerous enough to ensure a sufficient sound-absorbing effect. Besides, the surface of the interior side polyethylene foam is coated with an embossed vinyl chloride sheet, which gives a pleasing look to the panel.
3. Sandwiching of a metal lath facilitates thermal fusion of polyethylene foams with small holes and with large holes.
4. Since the sandwich between polyethylene foams is a metal lath, a ceiling panel with as many through holes as to ensure a good effect of sound absorption can be yielded without obstruction of through holes.

We claim:

1. Auto ceiling panel comprising:
   an interior side polyethylene foam;
   a vinyl chloride sheet bonded to the internal surface of said interior side polyethylene foam;
   a large number of fine holes running through both said interior side polyethylene foam and said vinyl chloride sheet;
   a ceiling side polyethylene foam thermally fused through a metal lath to the ceiling side surface of said interior side polyethylene foam;
   and a large number of less fine holes bored on said ceiling side polyethylene foam.

2. Auto ceiling panel of claim 1, wherein said interior side polyethylene foam and said ceiling side polyethylene foam are respectively 1.0 – 8.0mm thickness.

3. Auto ceiling panel of claim 1, wherein said metal lath is 0.5 – 1.5mm in thickness.

4. Auto ceiling panel of claim 1, wherein said interior side polyethylene foam and said ceiling side polyethylene foam are respectively 0.02 – 0.1 in specific gravity.

5. Auto ceiling panel of claim 1, wherein said vinyl chloride sheet is 0.01 – 0.5mm in thickness.

6. Auto ceiling panel of claim 1, wherein said fine holes are 0.1 – 3.0mm in diameter.

7. Auto ceiling panel of claim 1, wherein the open rates in said interior side polyethylene foam and said vinyl chloride sheet are 1 – 20%.

8. Auto ceiling panel of claim 1, wherein the holes in said ceiling side polyethylene foam are 1.0 – 8.0mm in diameter.

9. Auto ceiling panel of claim 1, wherein the open rate in said ceiling side polyethylene foam is 1 – 50%.

10. Auto ceiling panel of claim 1, wherein said vinyl chloride sheet bears an embossed pattern.

11. Auto ceiling panel manufacturing process comprising:
    a step of bonding a vinyl chloride sheet to the surface of an interior side polyethylene foam;
    a step of boring numerous fine holes on said interior side polyethylene foam and said vinyl chloride sheet such that said holes run through both said foam and said sheet;
    a step of boring numerous less fine through holes on a ceiling side polyethylene foam;
    a step of sandwiching a metal lath between said interior side polyethylene foam and said ceiling side polyethylene foam;
    a step of thermally fusing said metal lath to said interior side polyethylene foam and said ceiling side polyethylene foam, yielding a sandwiched laminated board;
    and a step of cold press-molding said sandwiched laminated board to a desired profile.

12. Auto ceiling panel manufacturing process of claim 11, wherein said interior side polyethylene foam and said ceiling side polyethylene foam are respectively 1.0 – 8.0mm in thickness.

13. Auto ceiling panel manufacturing process of claim 11, wherein said metal lath is 0.5 – 1.5mm in thickness.

14. Auto ceiling panel manufacturing process of claim 11, wherein said interior side polyethylene foam and said ceiling side polyethylene foam are respectively 0.02 – 0.1 in specific gravity.

15. Auto ceiling panel manufacturing process of claim 11, wherein said vinyl chloride sheet is 0.01 - 0.5mm in thickness.

16. Auto ceiling panel manufacturing process of claim 11, wherein said fine holes are 0.1 - 3.0mm in diameter.

17. Auto ceiling panel manufacturing process of claim 11, wherein the open rates in said interior side polyethylene foam and said vinyl chloride sheet are 1 - 20%.

18. Auto ceiling panel manufacturing process of claim 11, wherein the holes in said ceiling side polyethylene foam are 1.0 - 8.0mm in diameter.

19. Auto ceiling panel manufacturing process of claim 11, wherein the open rate in said ceilong side polyethylene foam is 1 - 50%.

20. Auto ceiling panel manufacturing process of claim 11, wherein an embossed pattern is given to said vinyl chloride sheet before said sheet is attached to said interior side polyethylene foam.

* * * * *